United States Patent
Chen

(10) Patent No.: US 10,789,032 B2
(45) Date of Patent: Sep. 29, 2020

(54) FRAMELESS DISPLAY MODULE

(71) Applicant: Qisda Corporation, Taoyuan (TW)

(72) Inventor: Wei-Jou Chen, Zhubei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/234,321

(22) Filed: Dec. 27, 2018

(65) Prior Publication Data

US 2020/0004490 A1     Jan. 2, 2020

(30) Foreign Application Priority Data

Jun. 29, 2018    (CN) .......................... 2018 1 0700022

(51) Int. Cl.
     *G06F 3/14*      (2006.01)
     *G09G 5/373*      (2006.01)
     *G09G 3/36*      (2006.01)
     *G02F 1/1333*      (2006.01)
     *G02F 1/1335*      (2006.01)

(52) U.S. Cl.
CPC ........... *G06F 3/1446* (2013.01); *G09G 5/373* (2013.01); *G02F 1/1333* (2013.01); *G02F 1/1335* (2013.01); *G09G 3/36* (2013.01); *G09G 2300/026* (2013.01); *G09G 2310/0232* (2013.01); *G09G 2340/0407* (2013.01)

(58) Field of Classification Search
CPC ........ G06F 3/1446; G09G 5/373; G09G 3/36; G09G 2300/026; G09G 2310/0232; G09G 2340/0407; G02F 1/1333; G02F 1/1335
See application file for complete search history.

(56) References Cited

U.S. PATENT DOCUMENTS

| | | | |
|---|---|---|---|
| 2013/0083080 A1* | 4/2013 | Rappoport | G09G 3/20 345/690 |
| 2014/0218918 A1* | 8/2014 | Moriwaki | H04N 5/64 362/237 |
| 2015/0097837 A1* | 4/2015 | Jepsen | G06F 3/1446 345/428 |
| 2015/0200062 A1* | 7/2015 | Ura | H01H 13/023 200/314 |
| 2015/0211707 A1* | 7/2015 | Watanabe | G02F 1/133308 345/667 |
| 2017/0082784 A1* | 3/2017 | Niu | G02B 3/06 |
| 2018/0033356 A1* | 2/2018 | Zhou | G09G 3/007 |
| 2018/0122288 A1* | 5/2018 | Huang | G09G 3/3648 |

* cited by examiner

*Primary Examiner* — Darlene M Ritchie

(57) ABSTRACT

A display module including display layer and light transmissive layer is provided. The display layer includes display pixels, the display pixels are distributed in first section and second section to display a first image, and the density of the display pixels in the second section is higher than the density of the display pixel in the first section. The light transmissive layer has first surface and second surface, wherein the second surface is facing the display layer. The light transmissive layer enlarges the first image provided by the display layer onto the first surface to form second picture, wherein the image from the second section is transmitted to the boarder area through the light transmissive layer. A display device is also provided.

13 Claims, 4 Drawing Sheets

FRAMELESS DISPLAY MODULE

FIELD OF THE INVENTION

The present invention relates to a display module; more particularly, to a frameless display module, consisting display pixels with different densities in different sections.

BACKGROUND

In our daily lives, display techniques such as liquid crystal display (LCD), electrophoretic display (EPD), organic light emitting diode (OLED) display, or micro light emitting diode (mLED) display are fully integrated in many kinds of electronic devices. Display using technique above possess characteristic of being lighter, thinner, and the space requirement is reduced, and user can place multiple flat screen display in order to combine a bigger picture on desks or wall.

However, the frame of the displays are visible, and therefore the frames are crossing the combined image while the displays are adjacently disposed, which affecting quality of the display image combined by the displays. Some displays nowadays can reduce the visibility of the frame in the visible area of the display by magnifying the image in the rim area. However, the image in the rim area is blurred and the resolution is bad after being magnified. Therefore, reducing the affect of the frame to the display image of the display is one of the main issue in the development of the display industry.

SUMMARY

The present invention provides a frameless display module being able to reduce the visibleness of the frame in the visible area, so as to maintain good picture quality.

The display module of the present invention includes a display layer and a light transmissive layer. The display layer includes display pixels, and the display pixels are distributed in the first section and the second section to display a first image. The distribution density of the display pixels in the second section is higher than the distribution density of the display pixels in the first section. The light transmissive layer includes a first surface and a second surface, and the second surface is facing the display layer. The light transmissive layer magnifies the first image provided by the display layer, transmitting from the second surface to the first surface and formed a second image, wherein the image of the second section is transmitted to the periphery area of the first section through the light transmissive layer.

In one embodiment of the present invention, the dimension where the first section is corresponded to the second image and the dimension where the first section is corresponded to the first image are the same. The dimension where the second section is corresponded to the second image is bigger than the dimension where the second section is corresponded to the first image.

In one embodiment of the present invention, the display module further includes frame enclosing the edges of the display layer. The light transmissive layer covers the display layer and the frame, and the frame is covered by the second image of the first surface.

In one embodiment of the present invention, the display pixels are substantially arranged along first direction. In the first direction, the width of every display pixels in the second section is smaller than the width of every display pixels in the first section.

In one embodiment of the present invention, the display pixels are substantially arranged along second direction being perpendicular to the first direction. In the second direction, the width of every display pixels in the second section is smaller than the width of every display pixels in the first section.

In one embodiment of the present invention, the distribution density of the display pixels in a third section of the display layer is higher than the distribution density of the display pixel in the second section. Image from the third section is transmitted to the corner area of the first surface through the light transmissive layer, and image from the second section is transmitted to the rest of the periphery area of the first surface through the light transmissive layer.

In one embodiment of the present invention, the display layer displays image at a light emitting surface, and the third section is located at the corner of the light emitting surface, and the second section is located at the rest of the periphery of the light emitting surface.

In one embodiment of the present invention, the transmission layer magnifies images of the second section and the third section, and the magnification of the transmission layer to the image of the third section is larger than the magnification of the transmission layer to the image of the second section.

In one embodiment of the present invention, the display layer displays image at the light emitting layer, and the second section is located at the periphery.

In one embodiment of the present invention, the light transmission layer magnifies the image from the second section.

In one embodiment of the present invention, a display device for displaying a combined image, comprises a first display module and a second display module, The first display module comprises a first display layer and a first light transmissive layer. The first display layer comprises a plurality of display pixels distributed in a first section and a second section. The display pixels are configured to display a first image. The density of the display pixels in the second section is higher than the density of the display pixels in the first section. The first light transmissive layer magnifies the first image onto a first surface and forms a second image. The image of the second section is transmitted to a periphery of the first surface through the first light transmissive layer.

The second display module comprises a second display layer and a second light transmissive layer. The second display layer comprises a plurality of display pixels distributed in a third section and a fourth section. The display pixels are configured to display a third image. The density of the display pixels in the fourth section is higher than the density of the display pixels in the third section. The second light transmissive layer magnifies the third image onto a second surface and forms a fourth image. The image of the fourth section is transmitted to a periphery of the second surface through the second light transmissive layer. The periphery of the first surfaces is connected to periphery of the second surface. The combined image includes the second image and the fourth image.

The display of the present invention includes a display layer, a frame, and a light transmissive layer. The display layer is configured to display a first image, and including a first section and second section. The display layer includes display pixels, and the display pixels are distributed in the first section and the second section, The second section is disposed at the periphery of the display layer, and the distribution density of the display pixels in the second section is higher than the distribution density of the display pixels in the first section. The frame encloses the edges of the display layer. The light transmissive layer has a first surface and a second surface, and the second surface is facing the display layer and covering the display layer and the frame, and the first image is magnified by the light transmissive layer and form a second image at the first surface, and the second image covered the frame.

In one embodiment of the present invention, the dimension where the first section is corresponded to the second image and the dimension where the first section is corresponded to the first image are the same. And the dimension where the second section is corresponded to the second image is bigger than the dimension where the second section is corresponded to the first image. The part of the display image displayed by the display pixels of the second section is magnified to the second image through the light transmissive layer.

As mention above, the display module of the present invention can provide first image with different pixel density through the display layer, magnifying as second image through the light transmissive layer. The display device of the present invention provided display image with multiple adjacent display modules, so as to provide a good combined image. The display of the present invention can provide good frameless image with the display layer and the light transmissive layer.

DETAILED DESCRIPTION OF THE PREFERRED EMBODIMENTS

The display module of the present invention can be display techniques using, for example, liquid crystal display (LCD), electrophoretic display, organic light emitting diode, micro light emitting diode. The following will take LCD device for example to describe the detailed characteristics of the display module, display device, and display in the examples of the present invention. However, the techniques of the present invention are not limited to the application of the display techniques above.

Figure 1:
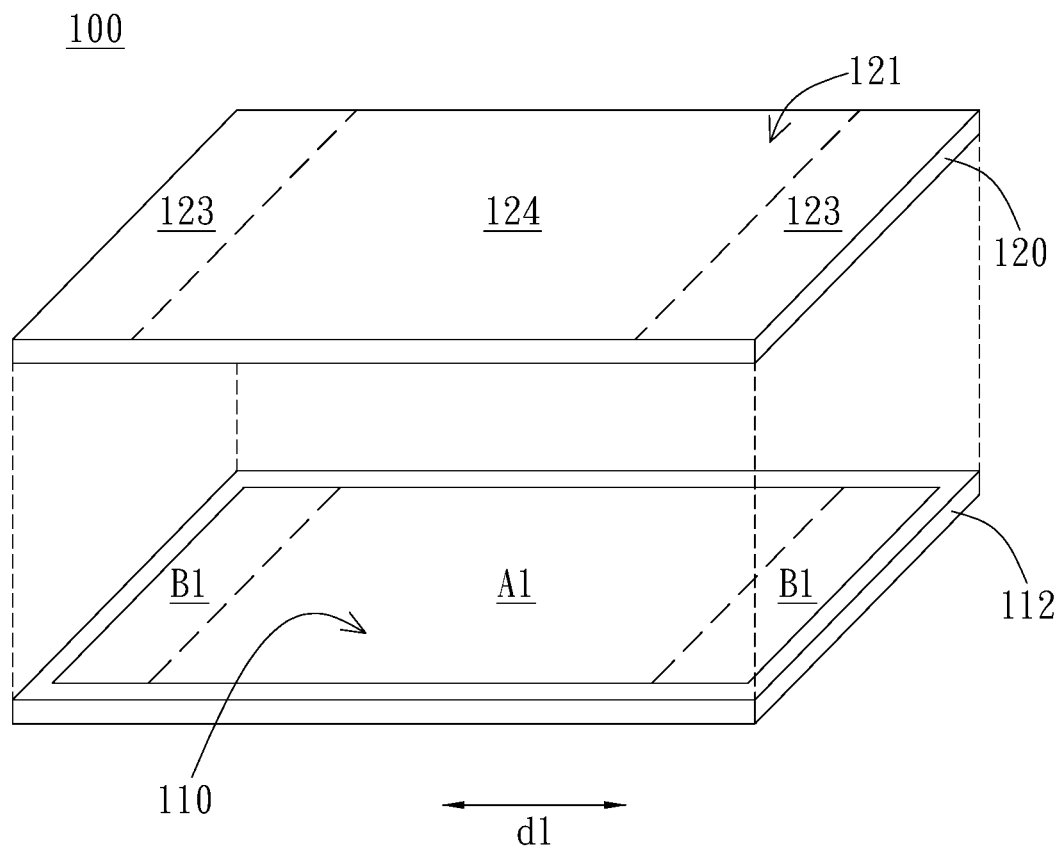
FIG. 1 is a exploded perspective view of the display module of the first example of the present invention.

FIG. 1 is a exploded perspective view of the display module 100 of the first example of the present invention. Please refer to FIG. 1, in the first example of the present invention, display module 100 includes display layer 110 and light transmissive layer 120, and the light transmissive layer 120 is disposed above the display layer 110, so as to receive display light from the display layer 110. The display layer 110 is divided into one first section A1 and two second sections B1. The frame 112 encloses the four edges of the display layer 110 to support the display layer 110. The light transmissive layer 120 is divided into the middle section 124 corresponded to the first section A1 and two periphery sections 123 corresponded to the two second sections B1 of the display layer 110. The display light from the display layer 110 can form an image on the first surface 121 of the light transmissive layer 120.

Figure 2A:
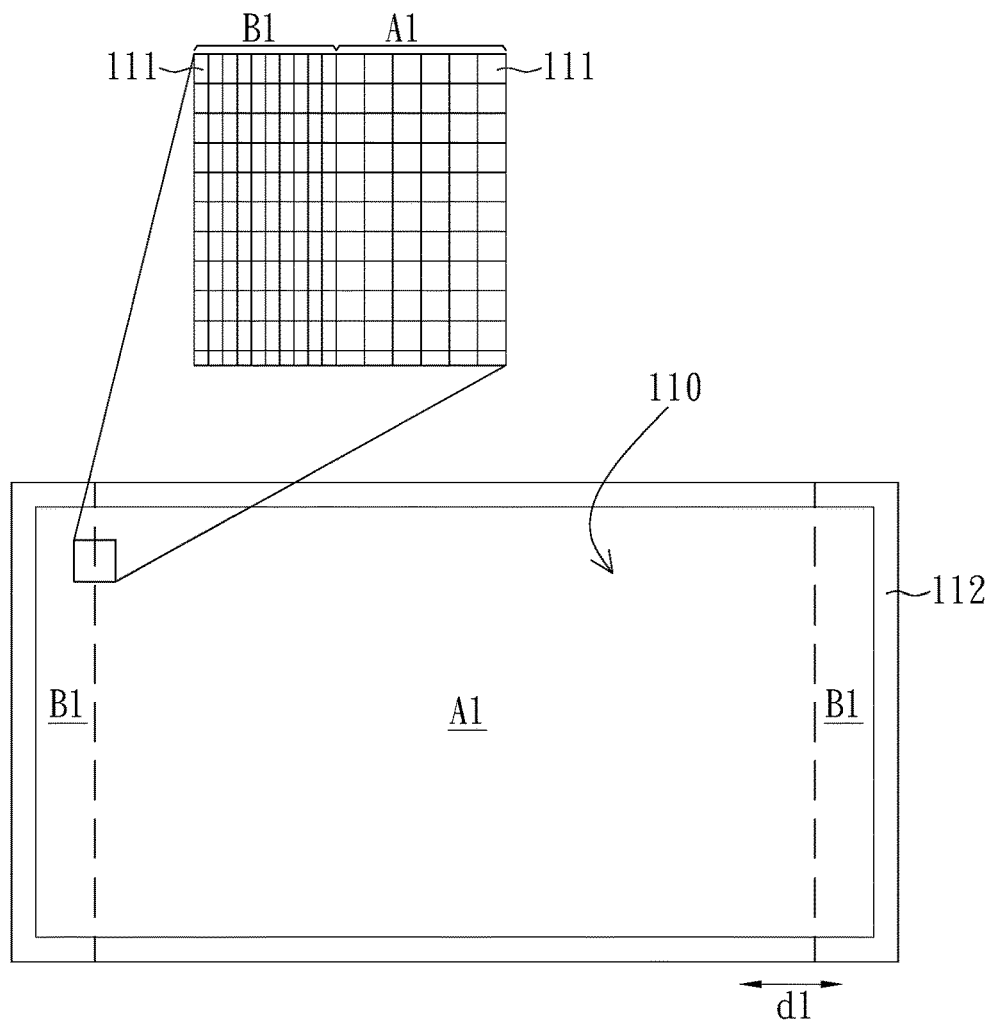
FIG. 2A is a schematic and partial enlarged schematic view of the display layer of the first example of the present invention.

FIG. 2A is schematic view and partial enlarged schematic view of the display layer of the display module of the first example of the present invention. In the display module 100 of the first example of the present invention, display pixels 111 of the display layer 110 possess different distribution densities in different sections. In this example, the display layer 110 is, for example, liquid crystal active layer, which includes multiple display pixels 111 formed of liquid crystal, and the display pixels 111 are distributed in the first section A1 and the second sections B1, wherein the distribution density of the display pixels 111 in the second sections B1 is higher than the distribution density of the display pixels 111 in the first section A1. In details detail, in the display layer 110 of this example, the number of display pixels 111 distributed in the unit are of the first section A1 is less than the number of display pixels 111 distributed in the unit are of the second sections B1.

The display layer 110 of the first example of the present invention further includes backlight module (not illustrated in FIG. 2A) providing backlight, and the display layer 110 can transform the backlight into the display light being able to display the first image. The first image is formed of the display pixels 111 of the display layer 110. A part of the first image is formed by the display pixels 111 in the first section A1 which are distributed in lower density, and a part of the first image is formed by the display pixels 111 in the second section B1 area distributed in higher density.

Figure 2B:
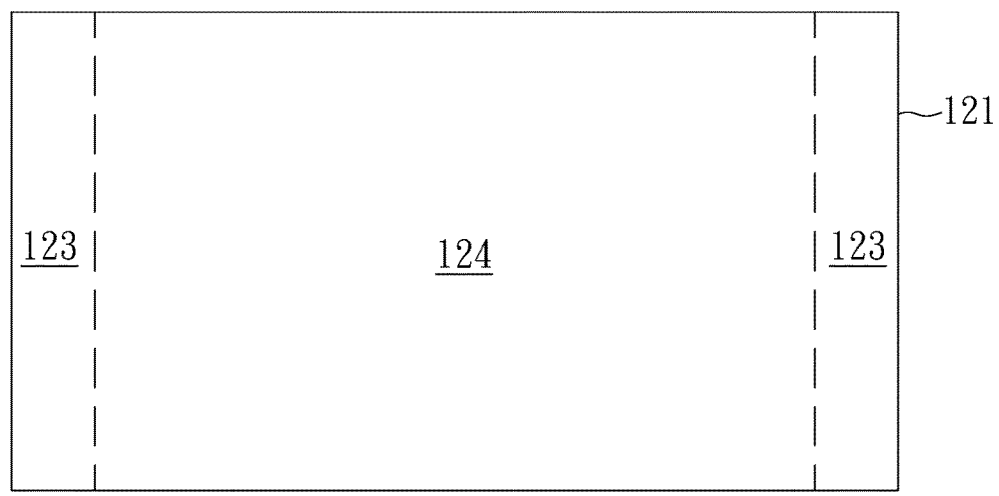
FIG. 2B is a schematic view of the light transmission layer of the first example of the present invention.

FIG. 2B is schematic view of the light transmissive layer 120 of the display module 100 of the first example of the present invention. The light transmissive layer 120 is located on the display layer 110. The display layer 110 can transmit the first image to the first surface 121 and form a second image on the first surface 121. To be specific, when the light transmissive layer 120 is disposed on the display layer 110, the surface of the light transmissive layer 120 facing the display layer 110 is the second surface (not illustrated in FIG. 2B). The display light of the first image provided by the display pixels 111 of the display layer 110 can enter the light transmissive layer 120 from the second surface, and the first image can be magnified to form the second image at the first surface 121 after the display light is transmitted by the light transmissive layer 120.

Please refer to both FIGS. 2A and 2B. The periphery sections 123 of the light transmissive layer 120 is corresponded to the second sections B1 of the display layer 110. The image provided by the display pixels 111 in the second sections B1 can be transmitted to the periphery sections 123 of the first surface 121 through the light transmissive layer 120. The image provided by the display pixels 111 of the first section A1 can be transmitted to the middle area 124 of the first surface 121 through the light transmissive layer 120. Since the distribution density of the display pixels 111 in the second section B1 is higher than the distribution density of the display pixels 111 in the first section A1, when the light transmissive layer 120 magnifies the part of the first image from the display pixels 111 of the second section B1 and forms second image in the periphery 123, the second image in the periphery 123 won't have situation such as blur or distortion.

As seen from the example above, since the display layer 110 has different distribution densities in areas A1 and B1, when the light transmissive layer 120 magnifies image corresponding to the periphery sections 123, the second image formed by the light transmissive layer 120 at the first surface 121 can possess good image quality, wherein the dimensions of the part of second image corresponded to the first section A1 and the part of the first image corresponded to the first section A1 are the same; the dimension of the part of second image corresponded to the second section B1 is bigger than the dimension of the part of first image corresponded to the first section A1.

Furthermore, the display module 100 of this example can provide a good frameless image, avoiding the frame 112 being exposed in the visible area of the display module. For example, the display module further includes frame 112. The frame 112 is set to enclose the four edges of the display layer 110, and, when the light transmissive layer 120 is disposed on the display layer 110, the light transmissive layer 120 can cover the display layer 110 and also the frame 112. The periphery sections 123 of the light transmissive layer 120 shields the frame 112. When the second image displays on the first surface 121, the light transmissive layer 120 can shield and hide the frame 112 with the second image. Since the distribution densities of the display pixels 111 in the first section A1 and the second section B1 are different, and the distribution densities of the display pixels 111 in the second section B1 is higher. When the light transmissive layer 120 magnifies the first image and forms the second image on the first surface 121 being able to shield and hide the frame 112, the second image can still maintain good image quality.

What needs to be specially explained is that the display module 100 presented by the example, including the display layer 110, and the light transmissive layer 120 can form, for example, a single display, and the second image magnified by the light transmissive layer can shield the frame 112, enclosing the edges of the display layer 110. Therefore, the display module 100 comprising the display layer 110 and the light transmissive layer 120 of the example can form a display being able to display a frameless image, and the display image can maintain a good image quality in visible area (which substantially is the distribution area of the first surface 121).

The following will describe the distribution of the display pixels of the display layers in the example of the present invention. Please refer to FIG. 2A, since these display pixels 111 in the display layer 110 forms a light emitting surface. The display layer 110 displays an image with the light emitting surface while the second section B1 is at the periphery of the light emitting surface. Display layer 110 displays image with the light emitting surface while the second sections B1 is at the periphery of the light emitting surface. Therefore, when the display layer 110 and the light transmissive layer 120 of this example can be combined to form a display, the display can be put side by side with another display having the same structure on the direction d1. Both of the displays magnify image from the second sections B1 of each display with the light transmissive layer 120 of the displays, and the frames of the displays won't be visible in the display images provided by the displays. In other example, grand size display device or video wall can be formed of multiple display layers 110 and light transmissive layers 120 arranged in the direction d1, and the invention is not limited to these application of the display module.

In the display layer 110 of the present invention, the display pixels 111 are substantially arranged in the first direction d1. On the first direction d1, the width of every display pixels 111 in the area B1 is smaller than the width of every display pixels 111 in the area A1. The display resolution is defined as the pixel number in a unit area. The width of the pixels in the second section B1 is smaller than the width of the pixels in the first section A1. When the distances between the boundaries of every pixels are the same, the display resolution of the second section B1 is higher than the display resolution of the first section A1. Because of the high display resolution in the second section B1, the image can avoid distortion after being magnified by the light transmission layer 120, and the image is not blurred.

However, the display pixels 111 of the present invention are not limit to controlling their distribution by changing the width of pixels, The following description is another example. Please refer to FIG. 3A, in the display device 200 of the second embodiment of the present invention, display layer formed of the display pixels 211 are enclosed by the frame 212, and the light transmissive layer 220 are formed of, for example, transmission device such as light transmitting protection covers 225 and 226. The protection covers 225 and 226 are formed of light transmissive material such as plastic or glass. The portion of the protection covers 225 and 226, corresponding to the section B2, can be provided as curved surface 225S and 226S in order to magnify the first image provided by the display pixels 211 of the section B2. The present invention is not limit to the formation of the light transmission layer 220, nor the inclined surface 225S design of the transmissive protection cover 225 and the curved surface 226 design of the transmissive protection cover 226. In other example of the present invention, the light transmissive layer 220 can possess stair-like structure or materials with different refractive index, in order to magnify the first image.

Figure 3A:
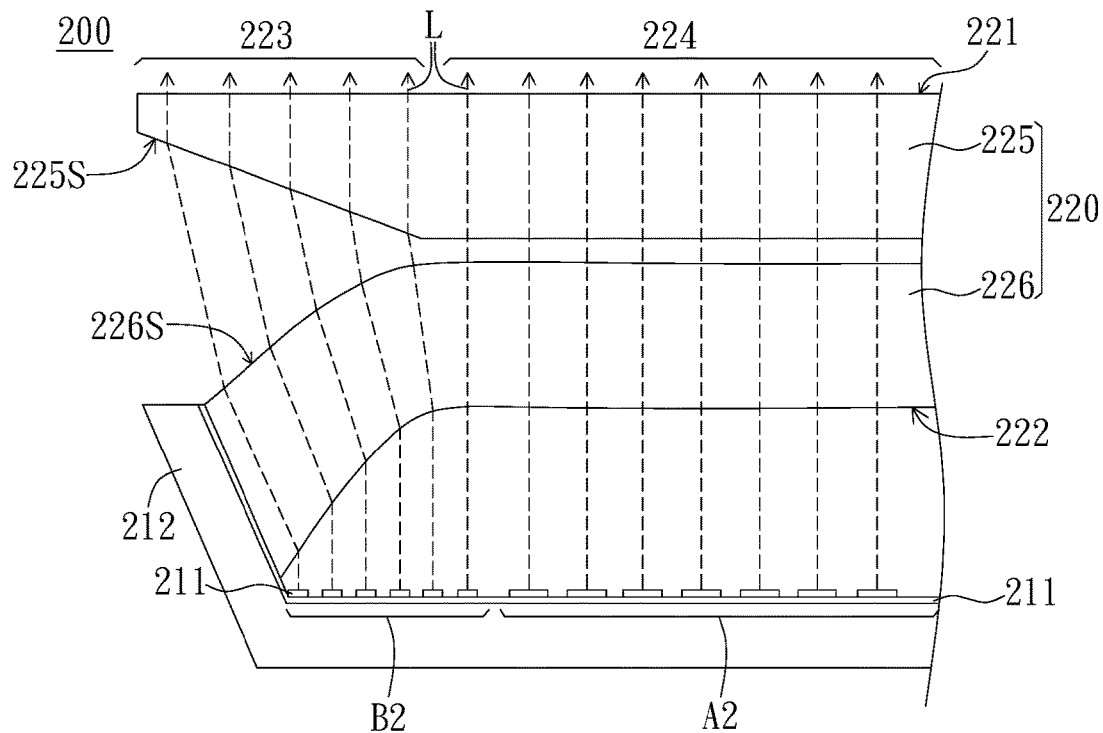
FIG. 3A is a section view of the display module of the second example of the present invention.

Please refer to FIG. 3A, the width of the display pixels 211 in the first section A2 is bigger than the width of the display pixels 211 in the second section B2, and gaps between the adjacent display pixels 211 in the first section A2 can be bigger than or equal to the gaps between the adjacent display pixels 211 in the second section B2. In other words, the distribution of the display pixels 211 of the display layer in the present invention not only can be control by adjusting the width, but also can be control by adjusting the gaps between the display pixels 211, but the present invention is not limited thereof. For example, the size of the display pixels 211 in the sections A2 and B2 can be the same. The densities of the sections A2 and B2 can be adjusted by the size of the gaps between the pixels in different sections.

With the distribution density of the display pixels 211 in the first section A2 and the second section B2, display light L from the display pixels 211 can transmit through the protection cover 226 from the second surface 222, and through the protection cover 225 in sequence, forming second image at the first surface 221, and, with the magnification of the light transmission layer 220, the second image in the periphery 223 and the second image in the middle area 224 can possess the same quality.

Figure 3B:
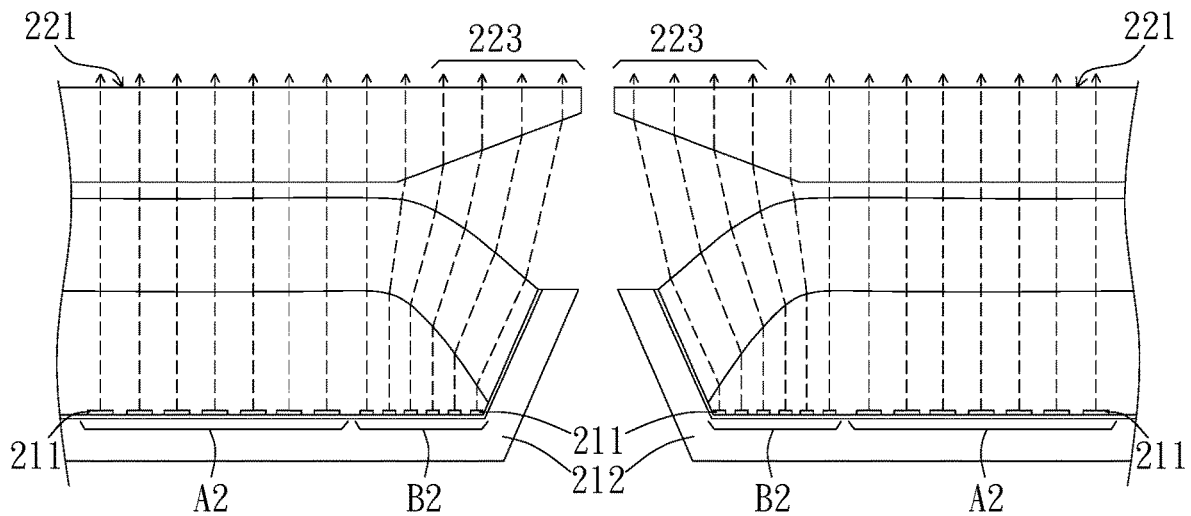
FIG. 3B is a section view of the display module of the second example of the present invention.

With the display module 200 above, a display device can further be formed of multiple display modules 200. Please refer to FIG. 3B, when two of the display modules 200 are adjacently arranged and formed a new display device. The view surface of the new display device is formed of the first surfaces 221. According to the difference of the distribution densities of the display pixels in the first section A2 and the second section B2, image of the adjacent area of the first surfaces 221 can be provided by the display pixels 211 in the second section B2 of the display module. The frames 212 can be shielded or covered by the image in the periphery 223 of the first surface 221. The user may look the new display device as a frameless display device.

In the embodiment, the light transmissive layers 220 of the display modules forming a grand display device are, for example, formed of multiple separated protection covers 225, 226, but the present invention is not limit thereto. In other example, the light transmissive layers 220 of the display modules 220 can be bonded to each other, preferably being bonded a form a protection cover 225, so as to provide a first surface 221 without gap for image display.

Figure 4A:
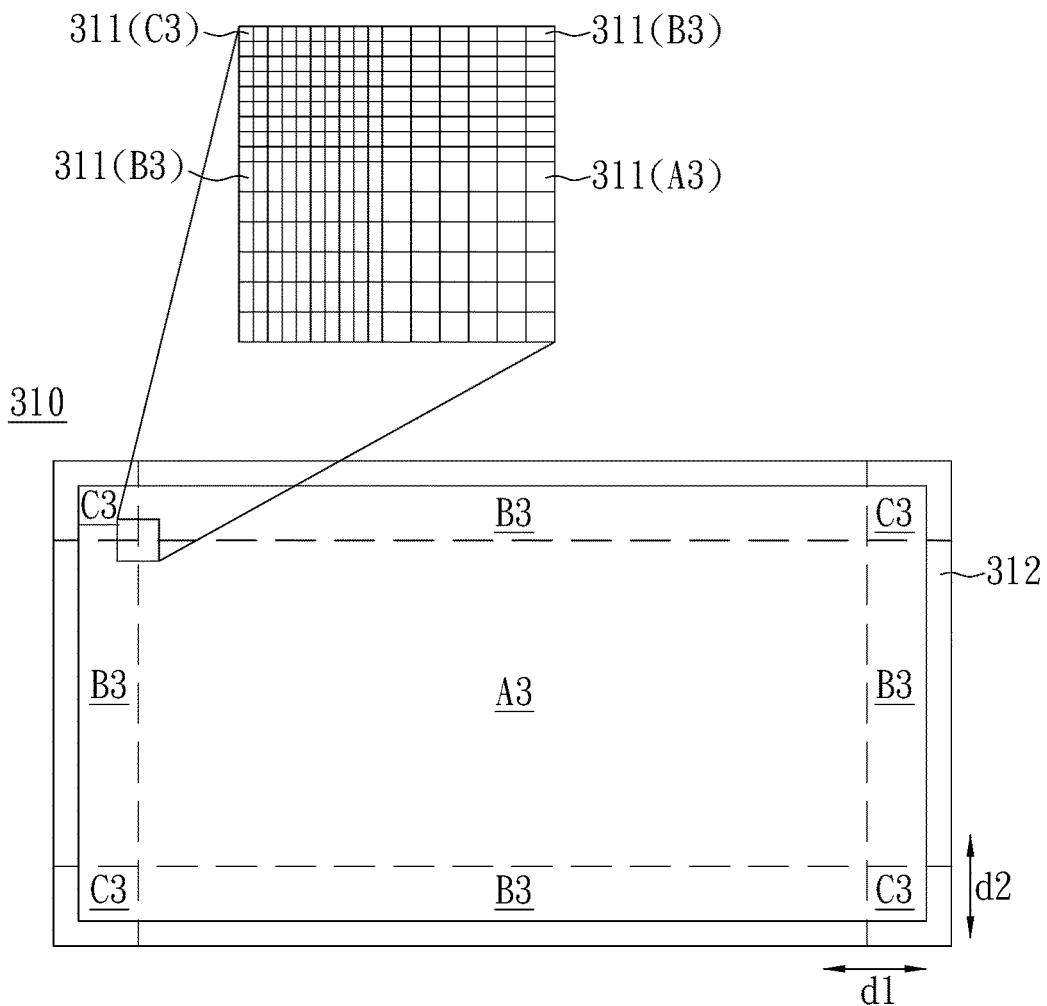
FIG. 4A is a schematic and partial enlarged schematic view of the display layer of the third example of the present invention.
Figure 4B:
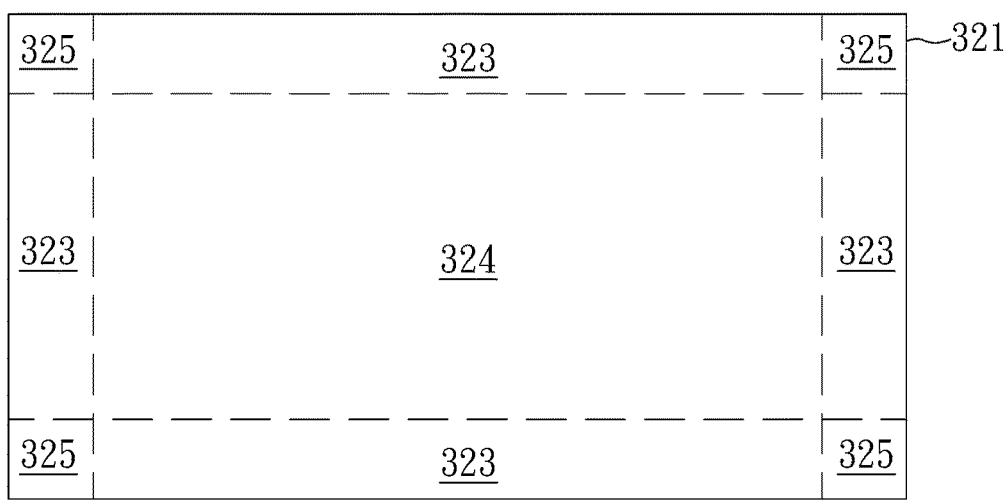
FIG. 4B is a schematic view of the light transmission layer of the third example of the present invention.

FIG. 4A, 4B are schematic view and the partial magnified schematic view of the display layer and the light transmissive layer of the third example of the present invention. Please refer to FIG. 4A, the distribution manner of the display pixels of the display layer in the present invention is not limited to the above distribution manner dividing into the first section and the second section. In the third example of the present invention, display layer 310 can further be divided into first section A3, second section B3, and third section C3. Distribution density of the display pixels 311 of the display layer 310 in the second section B3 is higher than the distribution density in the first section A3; distribution density of the display pixels 311 in the third section C3 is higher than the distribution density in the second section B3. Please further refer to FIG. 4B, the display pixels 311 in the third section C3 are corresponded to the corner area 325 of the light transmissive layer, and the display pixels 311 in the second section B3 are corresponded to the rest of the periphery 323, and the display pixels 311 in the first section A3 are corresponded to the middle area.

In other words, the display layer 310 of the example changed the distribution of the display pixels 311 according to the corner area 325 of the first surface 321 providing the second image in the light transmissive layer 310, and, when the light transmissive layer 320 is further magnifying the first image of the corner area 325 in order to shield or cover the frame in the corner area, the second image on the first surface 321 won't be blurry or having distortion.

In view of the arrangement of the pixels, the display layer 310 of the example also constructs the light emitting surface with the display pixels 311 which is able to emit image light, and the above mentioned third section C3 is located in the corner area of the light emitting surface, and the second section B3 is located in the rest of the periphery of the light emitting surface.

The display pixels 311 are arranged in both first direction d1 and second direction d2. In the first direction d1, width of the display pixels 311 in the first section A3 is bigger than the width of the display pixels 311 in the second section B3; in the second direction d2, width of the display pixels 311 in the first section A3 is also bigger than the width of the display pixels 311 in the second section B3. Therefore, widths of the display pixels 311 in both the first direction d1 and second direction d2 in the third section C3 are smaller than the width of the display pixels 311 in the first section A3 in these directions, so as to maintain the quality of the display image magnified by the light transmissive layer 320.

The display module of the present invention includes display layer 310 and light transmissive layer 320, and the display module can become a display independently, providing a frame-less display function. Multiple display modules can also construct a grand display device by arranging in the first direction d1 and the second direction d2, so as to fulfill the need of the grand display image, and the frame of the display modules merely affect the visible area of the grand display device.

To sum up, the display module, display device and display of the present invention can hide their frames in their visible area, and the quality of the display image in the periphery can be maintained. Good image display function can be provided with independent display or display constructed with multiple display modules of the invention.

What is claimed is:

1. A display module comprising:
   a display layer comprising a plurality of display pixels distributed in a first section, a second section and a third section, wherein the display pixels in the first section, the second section and the third section are configured to display a first part of a first image, a second part of the first image, and a third part of the first image, respectively, the density of the display pixels in the second section is higher than the density of the display pixels in the first section, and the density of the display pixels in the third section of the display layer is higher than the density of the display pixels in the second section; and
   a light transmissive layer having a first surface and a second surface, wherein the second surface faces the display layer, and the light transmissive layer magnifies the first image onto the first surface and forms a second image, wherein the third part of the first image is transmitted to a corner of the first surface through the light transmissive layer, and the second part of the first image is transmitted to a rest of a periphery of the first surface through the light transmissive layer;
   wherein a gap of display pixels in the second section is smaller than a gap of display pixels in the first section.

2. The display module of claim 1, wherein a dimension in which the first section is corresponded to the second image is the same as a dimension in which the first section is corresponded to the first image, and a dimension in which the second section is corresponded to the second image is larger than a dimension in which the second section is corresponded to the first image.

3. The display module of claim 1 further includes: a frame, enclosing edges of the display layer, and the light transmissive layer covers the display layer and the frame, and the frame is covered by the second image on the first surface.

4. The display module of claim 1, wherein the display layer displays the first image at a light emitting surface, the third section is located at the corner of the light emitting surface, and the second section is located at the rest of the periphery of the light emitting surface.

5. The display module of claim 1, wherein the light transmissive layer magnifies the second part of the first image and the third part of the first image, and the magnification of the third part of the first image is higher than the magnification of the second part of the first image.

6. The display module of claim 1, wherein the light transmissive layer magnifies the second part of the first image.

7. The display module of claim 1, wherein the display pixels are substantially arranged along a first direction; a width of the display pixels in the second section is smaller than a width of the display pixels in the first section in the first direction.

8. The display module of claim 7, wherein the display pixels are further arranged along a second direction being perpendicular to the first direction; a width of the display pixels in the second section is smaller than a width of the display pixels in the first section in the second direction.

9. A display device for displaying a combined image, comprising:
- a first display module comprising a first display layer and a first light transmissive layer, the first display layer comprising a plurality of display pixels distributed in a first section, a second section and a third section, wherein the display pixels in the first section, the second section and the third section are configured to display a first part of a first image, a second part of the first image, and a third part of the first image, respectively, the density of the display pixels in the second section is higher than the density of the display pixels in the first section, the density of the display pixels in the third section of the display layer is higher than the density of the display pixels in the second section wherein the first light transmissive layer magnifies the first image onto a first surface and forms a second image, the third part of the first image is transmitted to a corner of the first surface through the first light transmissive layer, and the second part of the first image is transmitted to a rest of a periphery of the first surface through the first light transmissive layer; and
- a second display module comprising a second display layer and a second light transmissive layer, the second display layer comprising a plurality of display pixels distributed in a fourth section and a fifth section, wherein the display pixels in the fourth section and the fifth section are configured to display a first part of a third image and a second part of the third image, respectively, the density of the display pixels in the fifth section is higher than the density of the display pixels in the fourth section, wherein the second light transmissive layer magnifies the third image onto a second surface and forms a fourth image, the second part of the third image is transmitted to a periphery of the second surface through the second light transmissive layer;
- wherein the periphery of the first surface is connected to the periphery of the second surface and the combined image comprises the second image and the fourth image;
- wherein a gap of the display pixels in the second section is smaller than a gap of the display pixels in the first section.

10. The display device of claim 9, wherein the first display module comprises a first frame for enclosing edges of the first display layer, the second display module comprises a second frame for enclosing edges of the second display layer, the first surface and the second surface shield the first frame and the second frame.

11. A display module comprising:
- a display layer comprising a plurality of display pixels distributed in a first section, a second section and a third section, wherein the display pixels in the first section, the second section and the third section are configured to display a first part of a first image, a second part of the first image, and a third part of the first image, respectively, the second section is located at a periphery of the display area, the density of the display pixels in the second section is higher than the density of the display pixels in the first section, and the density of the display pixels in the third section of the display layer is higher than the density of the display pixels in the second section;
- a frame enclosing the edges of the display layer; and
- a light transmissive layer having a first surface and a second surface, wherein the second surface is facing the display layer and covering the display layer and the frame, and the light transmissive layer magnifies the first image and forms a second image on the first surface, wherein the third part of the first image is transmitted to a corner of the first surface through the light transmissive layer, and the second part of the first image is transmitted to a rest of a periphery of the first surface through the light transmissive layer;
- wherein a gap of the display pixels in the second section is smaller than a gap of the display pixels in the first section.

12. The display module of claim 11, wherein a dimension in which the first section is corresponded to the second image is the same to a dimension in which the first section is corresponded to the first image, and a dimension in which the second section is corresponded to the second image is larger than a dimension in which the second section is corresponded to the first image, and the second part of the first image is magnified on the first surface by the light transmissive layer.

13. The display module of claim 11, wherein the display pixels are substantially arranged along a first direction; a width of the display pixels in the second section is smaller than a width of display pixels in the first section in the first direction.

* * * * *